United States Patent
Hsu (10) Patent No.: US 6,573,632 B2
(45) Date of Patent: *Jun. 3, 2003

(54) STRUCTURE OF A STATOR FORMING AN ANNULARLY CLOSED STABLE STRUCTURE

(76) Inventor: Chun-Pu Hsu, No. 19, Wu Chuang Liu Rd., Wu Ku Industrial Park, Taipei Hsien (TW)

( * ) Notice: Subject to any disclaimer, the term of this patent is extended or adjusted under 35 U.S.C. 154(b) by 0 days.

This patent is subject to a terminal disclaimer.

(21) Appl. No.: 09/899,052

(22) Filed: Jul. 6, 2001

(65) Prior Publication Data

US 2003/0006663 A1 Jan. 9, 2003

(51) Int. Cl.$^7$ .............................. H02K 3/00; H02K 5/00
(52) U.S. Cl. ..................... 310/216; 310/218; 310/194
(58) Field of Search .................. 310/216, 217, 310/218, 254, 258, 259, 261, 42, 43, 71, 51, 194; 29/596, 609

(56) References Cited

U.S. PATENT DOCUMENTS

| | | | | |
|---|---|---|---|---|
| 2,769,104 A | * | 10/1956 | Hirsch | |
| 3,339,097 A | * | 8/1967 | Dunn | 310/217 |
| 5,583,387 A | * | 12/1996 | Takeuchi et al. | 310/217 |
| 5,786,651 A | * | 7/1998 | Suzuki | 310/259 |
| 5,918,360 A | * | 7/1999 | Forbes et al. | 29/596 |
| 6,127,753 A | * | 10/2000 | Yamazaki et al. | 310/71 |
| 6,211,587 B1 | * | 4/2001 | Enomoto et al. | 310/259 |
| 6,356,005 B1 | * | 3/2002 | Hsu | 310/254 |
| 6,400,059 B1 | * | 6/2002 | Hsu | 310/254 |
| 6,404,095 B1 | * | 6/2002 | Hsu | 310/254 |

FOREIGN PATENT DOCUMENTS

| JP | 360022454 | * | 2/1985 | 310/194 |
|---|---|---|---|---|

* cited by examiner

Primary Examiner—Tran Nguyen
(74) Attorney, Agent, or Firm—Rosenberg, Klein & Lee (57) ABSTRACT

The present invention separates stator teeth from stator portions into unit bodies to enhance effective operational efficiency of an electromotor or a generator. The unit bodies are respectively sleeved in insulating wire groove seats having annularly closed stable devices so that the stator coils can be disposed in the insulating wire groove seats with a higher occupied ratio of volume. A left and a right ends of teeth back face end portions of the insulating wire groove seats form two sideward-standing face portions, which correspond to and join each other to form an annularly closed stable joint. Thereby, swing oscillation generated by armature reaction of the stator teeth with rotor magnets can be eliminated, and the structural strength of the assembled stator portions can be enhanced. Therefore, the armature reaction between the stator portions and the rotor magnets can keep stable operation.

10 Claims, 7 Drawing Sheets

STRUCTURE OF A STATOR FORMING AN ANNULARLY CLOSED STABLE STRUCTURE

FIELD OF THE INVENTION

The present invention relates to a structure of stator wire groove seats having annularly closed stable devices and, more particularly, to a structure wherein two sideward-standing faces correspondingly meshed are built at a left and a right ends of adjacent stator wire groove seats to be used as an annularly closed stable joint.

BACKGROUND OF THE INVENTION

For industries consuming large amount of energy, the requirement of high-efficiency electromotors and generators has become an important issue in the fabrication technology. Both the operational efficiency and the fabrication process cannot be overlooked. The present invention proposes a structure of stator teeth wire groove seats to accomplish the fabrication of efficient motors, hence letting motors operate efficiently when being loaded. The present invention also proposes a structure of stator wire groove seats having annularly closed stable devices to let the operation of a stator portion and a rotor portion of a motor be stable and to reduce the noise of an excited motor.

Figure 1:
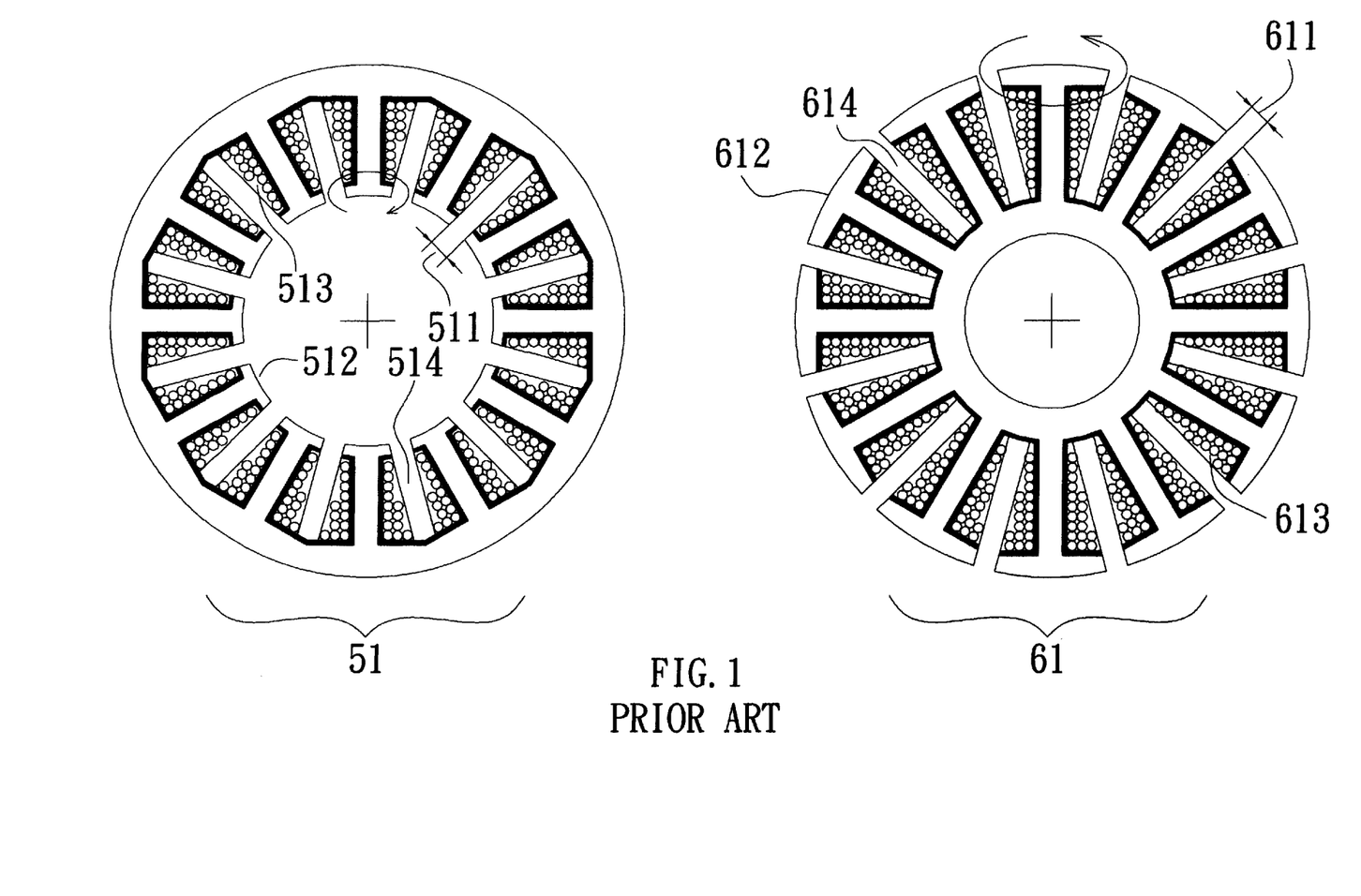
FIG. 1 is a diagram showing the occupied ratio of volume of stator coils of inner and outer stator portions in the prior art.
Figure 2A:
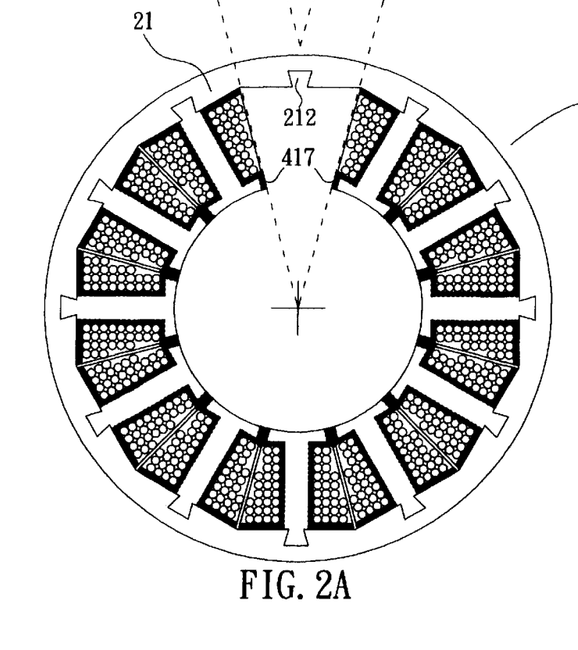
FIGS. 2A and 2C are cross-sectional views of stator teeth wire groove seats having annularly closed stable devices according to an embodiment of the present invention.
Figure 2B:
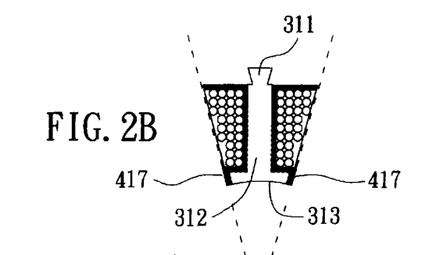
FIGS. 2B and 2D are diagrams showing the occupied ratio of volume of stator coils of stator teeth wire groove seats having annularly closed stable devices according to an embodiment of the present invention.
Figure 2C:
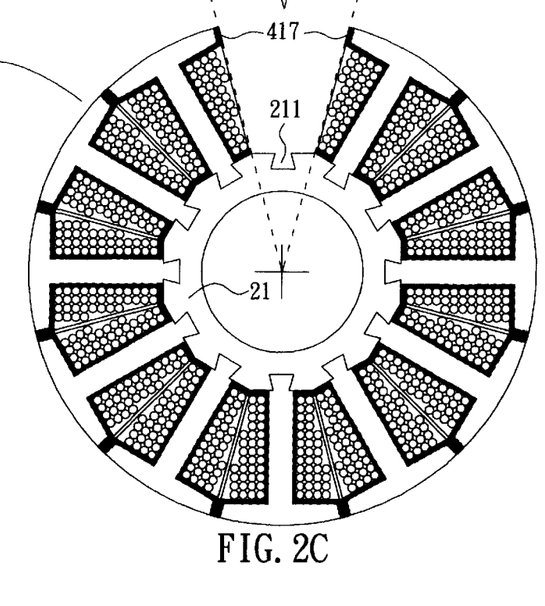
Figure 2D:
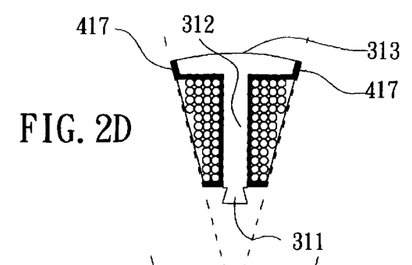
Figure 3A:
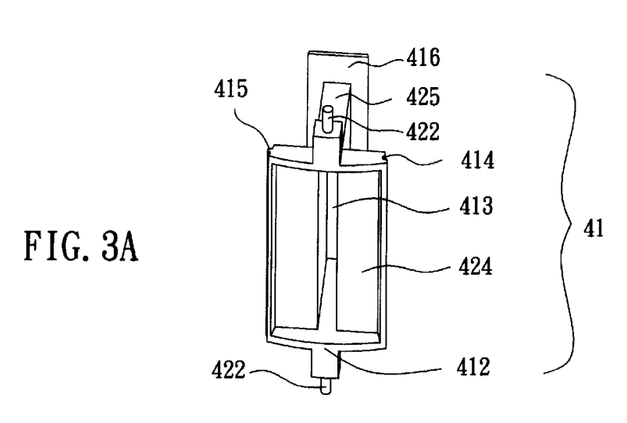
Figures 3A, 3A:
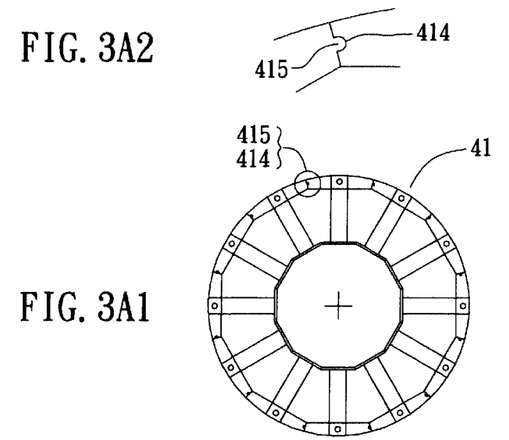
Figure 3B:
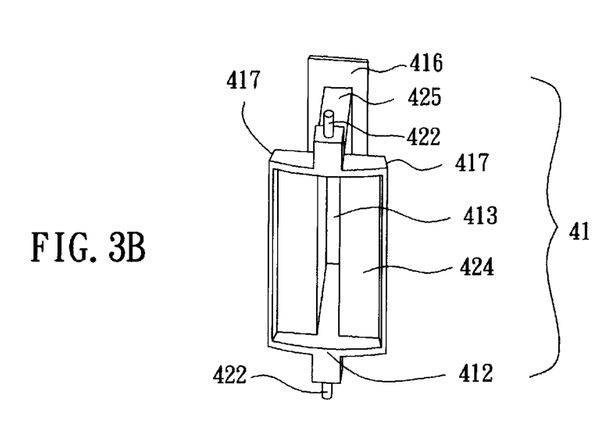
Figures 3B, 3B:
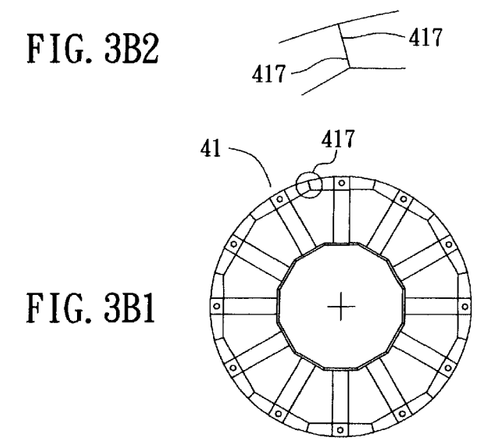
Figure 4A:
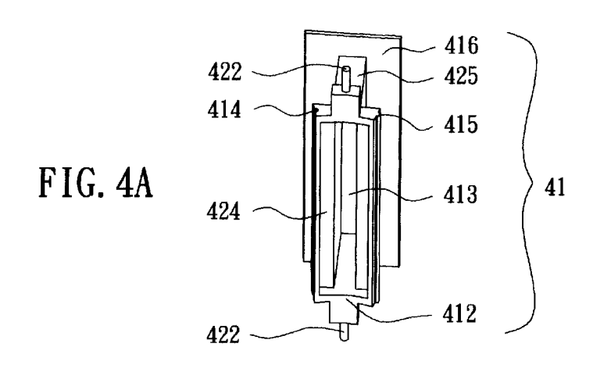
Figure 4A:
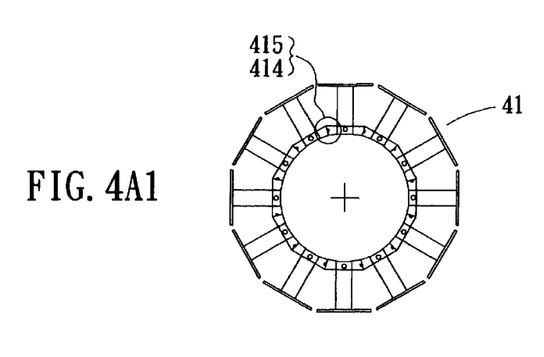
Figure 4A:
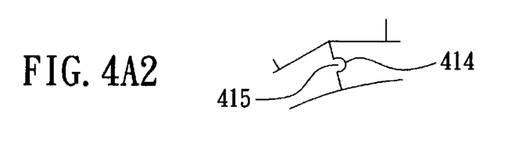
Figure 4B:
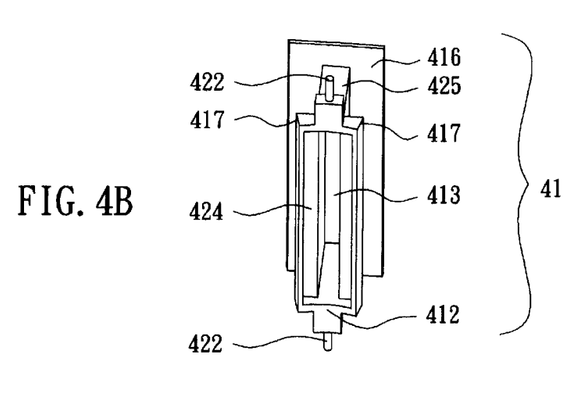
Figure 4B:
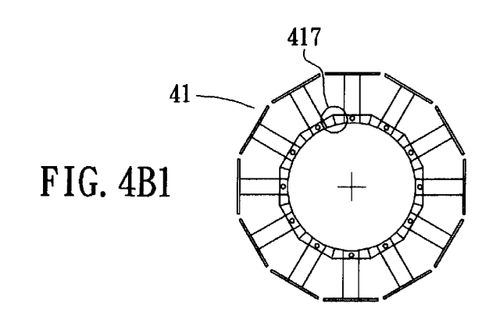
Figure 4B:
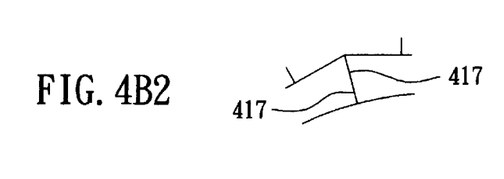
Figure 5A:
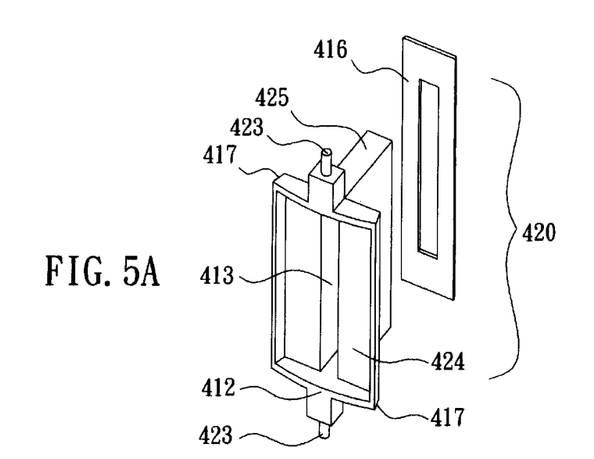
FIGS. 5A and 5B are diagrams of T-shaped teeth wire groove seats of inner and outer stators according to an embodiment of the present invention.
Figure 5B:
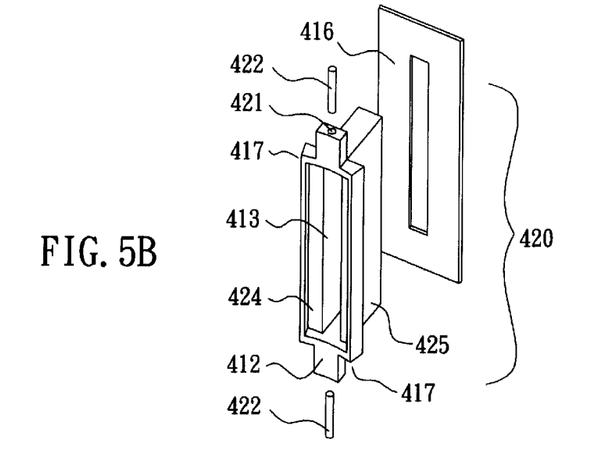
Figure 5C:
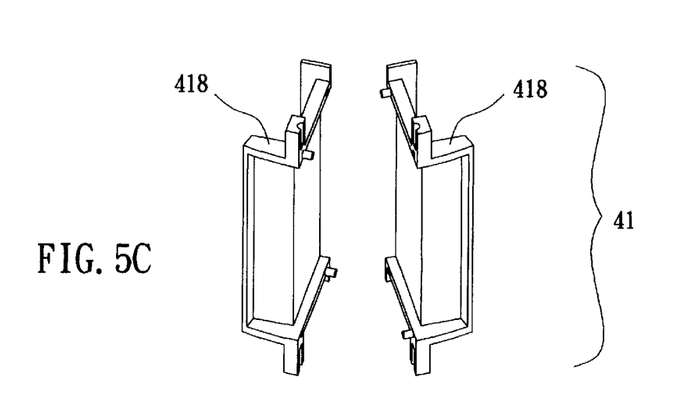
FIGS. 5C and 5D are diagrams of two independent unit bodies of outer and inner teeth wire groove seats according to an embodiment of the present invention.
Figure 5D:
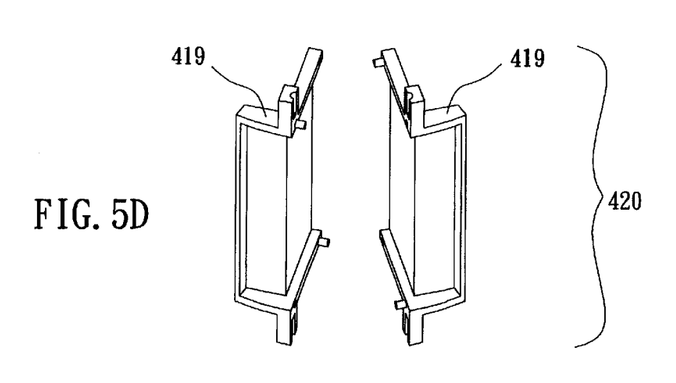
Figures 6A, 6B, 6C, 6D, 6E, 6F:
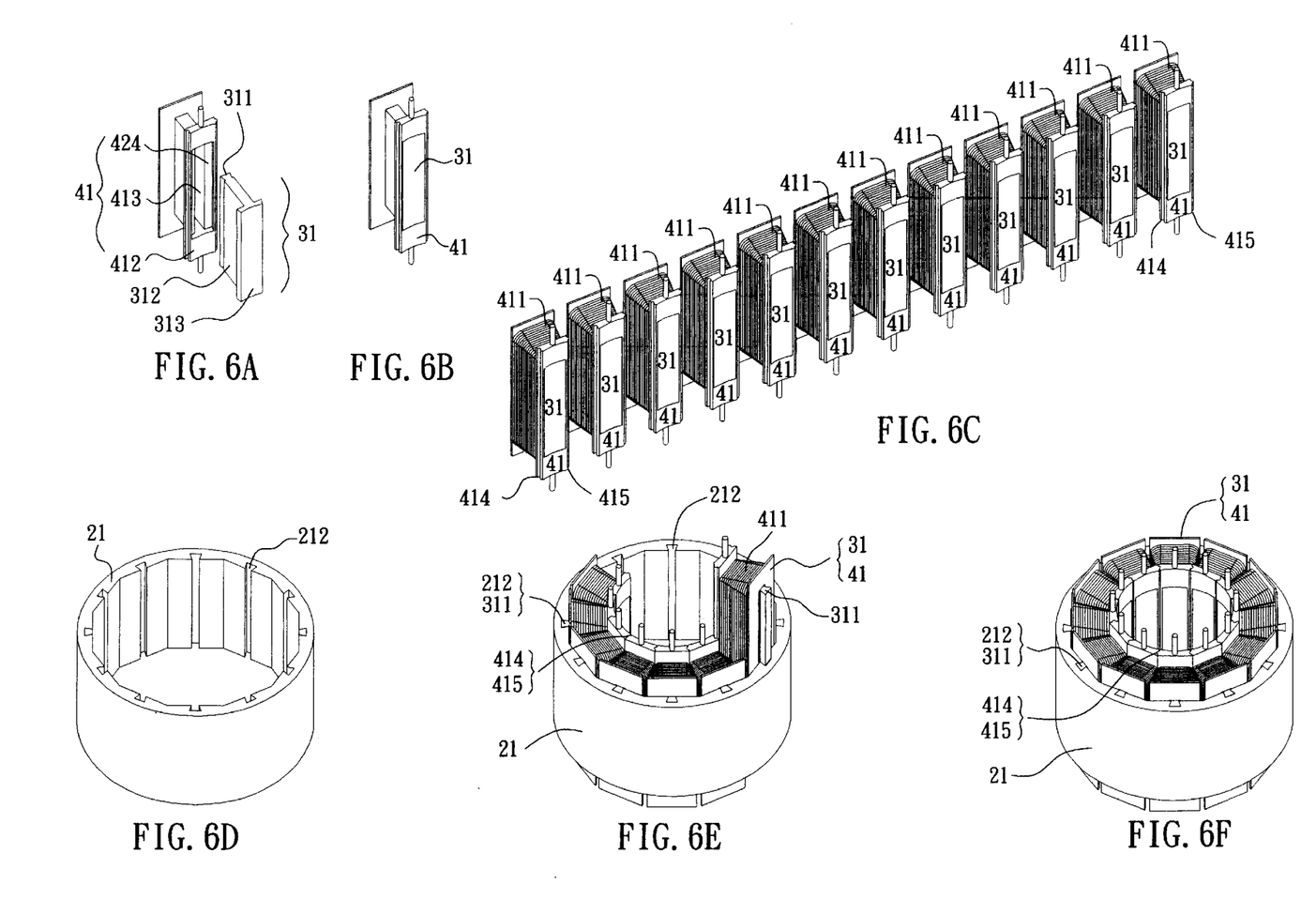
FIGS. 6A to 6F are diagrams showing the whole assembly of inner rotor type I-shaped teeth wire groove seats according to an embodiment of the present invention.
Figures 7A, 7B, 7C, 7D, 7E, 7F:
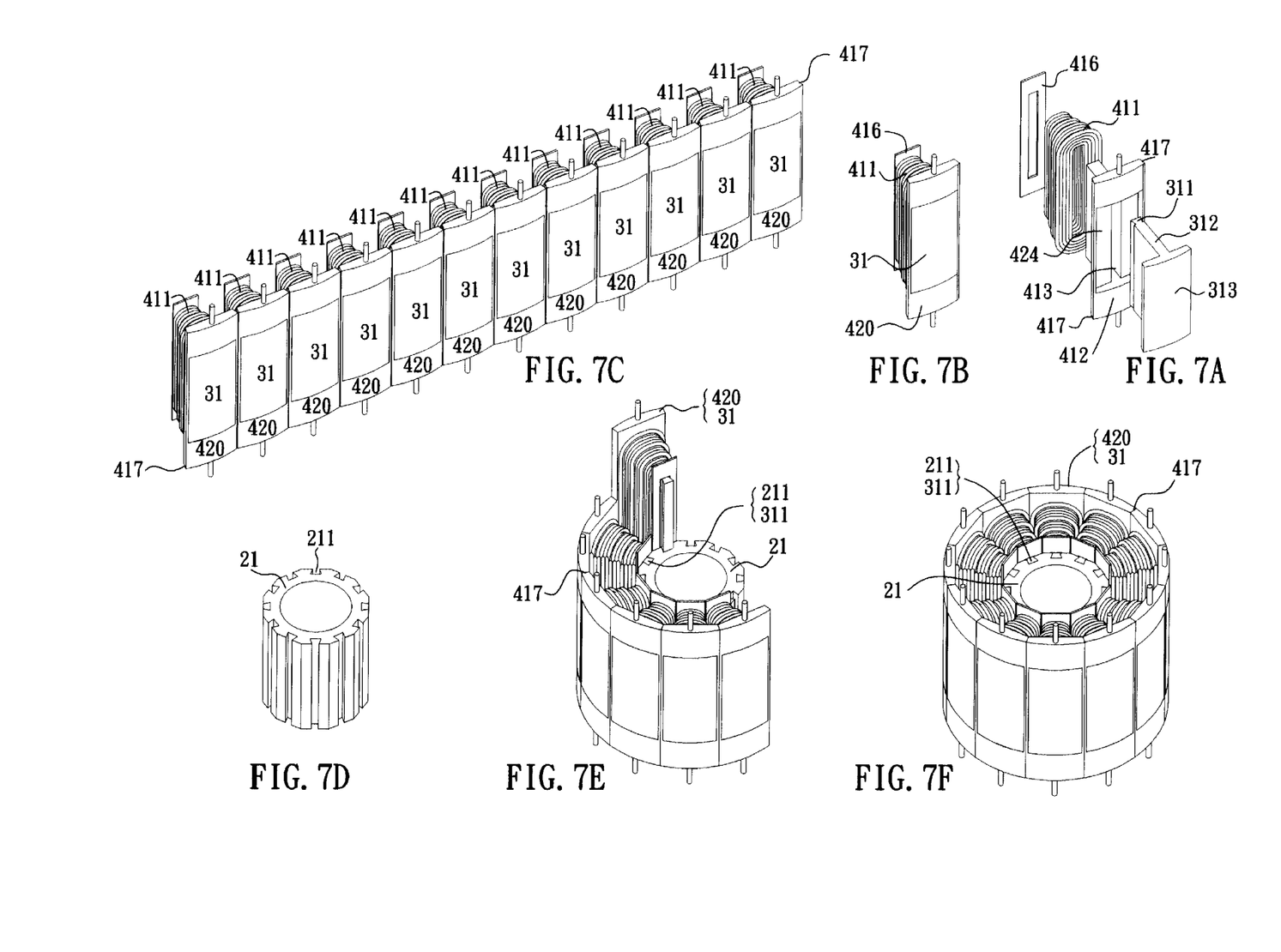
FIGS. 7A to 7F are diagrams showing the whole assembly of outer rotor type T-shaped teeth wire groove seats according to an embodiment of the present invention.

The bottleneck of manufacturing a high-efficiency motor usually arises in the problem of stator teeth coil windings. For a motor to have a high operational efficiency, it must have relatively high electric load and magnetic load. The electric load relates to the thickness and the count of wound conductors of the stator portion coils. A higher electric load represents a higher current density. To have a higher current density, stator coils with thicker wound conductors are required so that larger current can flow therein. Because a conventional inner rotor motor stator 51 or a conventional outer rotor motor stator 61 (as shown in FIG. 1) is integrally formed, ordered winding way is adopted to increase the occupied ratio of volume of stator portion wire groove (as winding portions 513 and 613 shown in FIG. 1). Because of passage of winding guide needles in and out wound coils at groove mouths 511 (or 611) of stator teeth 512 (or 612) of the inner rotor motor stator 51 (or the outer rotor motor stator 61), the space of wire groove winding is reduced, i.e., the occupied ratio of volume of stator coil wire groove is reduced. Under the condition of a fixed torsion coefficient $K_T$ or counter electromotive force coefficient $K_E$, the count of winding of a stator coil is fixed. Therefore, for a lower occupied ratio of volume, the diameter of wire of a stator coil must be thinner and smaller, resulting in a higher wire impedance. A larger current thus cannot flow in stator portion coils. Moreover, a higher wire impedance will let the coils generate high temperature due to the flow of current ($P=I^2 \cdot R$). The wire impedance of the coil will correspondingly rise due to the temperature rise of the metallic coil. This vicious circle will let most of the energy be consumed in the wire impedance of stator coils and transformed into useless thermal energy.

SUMMARY OF THE INVENTION

In consideration that wire grooves of a stator portion of a conventional electromotor or generator cannot provide a higher occupied ratio of volume for stator coils, stator teeth and teeth wire groove seats are separated from the stator portion, and the stator coils are then individually disposed in the teeth wire groove seats to provide a higher occupied ratio of volume of the wire grooves for the stator coils. However, because the stator teeth are divided into a plurality of unit bodies, which are then assembled to form a complete stator portion, the structural strength of embedded ends of roots of the stator teeth will be weakened because of the assembly. Therefore, when the motor operates under a large load, armature reaction of stator teeth coils and rotor magnets will let swing oscillation be easily generated between the stator teeth and the stator portion. This swing oscillation will affect the stability of operation of the motor. The armature reaction between the stator and the rotor will also inevitably let the embedded ends 311 of roots of the stator teeth easily generate friction noise with peripheral embedding grooves of an annular magnetic conductor 21. The present invention aims to provide a structure of stator wire groove seats having annularly closed stable devices to achieve the following objects.

1. The stator coils can be installed with the highest occupied ratio of volume by means of individually separated teeth wire groove seats.
2. Hollow ends of the teeth wire groove seats provide separable and flexible assembly for stator teeth magnetic conductors having curved faces.
3. Two sideward-standing faces of each of the teeth wire groove seats correspond to each other, and can be fastened, locked, or joined together to form an annularly closed stable device, which can enhance the structural strength of the whole stator portion after the stator teeth and the stator ring portion are assembled together.
4. Because the stator teeth magnetic conductors having curved faces are disposed at the hollow ends of the wire groove seats to provide stable effect for the stator teeth magnetic conductors, swing oscillation of the stator teeth due to powerful armature reaction can be eliminated.
5. Because of the elimination of the swing oscillation of the stator teeth magnetic conductors having curved faces, the friction noise generated by armature reaction between embedded ends of the stator teeth and embedding grooves of the stator ring portion can further be eliminated.

The various objects and advantages of the present invention will be more readily understood from the following detailed description when read in conjunction with the appended drawing, in which:

BRIEF DESCRIPTION OF THE DRAWINGS

FIGS. 3A, 3A1, and 3A2 are assembly diagrams of sideward-standing faces of outer rotor type stator teeth wire groove seats with concave and convex embedding joints according to an embodiment of the present invention;

FIGS. 3B, 3B1, and 3B2 are assembly diagrams of sideward-standing faces of outer rotor type stator teeth wire groove seats with planar joints according to an embodiment of the present invention;

FIGS. 4A, 4A1, and 4A2 are assembly diagrams of sideward-standing faces of inner rotor type stator teeth wire groove seats with concave and convex embedding joints according to an embodiment of the present invention;

FIGS. 4B, 4B1, and 4B2 are assembly diagrams of sideward-standing faces of inner rotor type stator teeth wire groove seats with planar joints according to an embodiment of the present invention;

DETAILED DESCRIPTION OF THE PREFERRED EMBODIMENTS

As shown in FIGS. 2 to 7, a structure of stator wire groove seats having annularly closed stable devices of the present invention comprises a plurality of stator teeth magnetic conductors having curved faces and a plurality of teeth wire groove seats.

The plurality of stator teeth magnetic conductors 31 are separated from embedding grooves 211 and 212 of annular magnetic conductors 21 of the stator. The curved faces thereof correspond to rotor face portions and can generate armature reaction.

The plurality of teeth wire groove seats 41, 418, 419, and 420 comprises teeth back face end portions 424 of the wire groove seats and lengthwise vertical poles 425. The teeth back face end portions 424 can let back face ends of the curved teeth faces 313 of the stator teeth magnetic conductors 31 be joined. Left and right ends of the teeth back face end portions 424 form two sideward-standing face portions 414, 415, and 417. Adjacent sideward-standing face portions 414, 415, and 417 correspond to each other and can be joined together. The lengthwise vertical poles 425 of the teeth wire groove seats 41 and 420 provide stator coil portions 411 for disposing coils. Inner hollow ends 413 of the lengthwise vertical poles 425 let root ends 312 of the stator teeth magnetic conductors 31 be sleeved therein.

The left and right sideward-standing face portions 414 and 415 of the teeth wire groove seats 41 and 420 can form corresponding concave and convex fastening face portions, and can let two adjacent ones be joined as an annularly closed fastening joint device.

The left and right sideward-standing face portions 414 and 415 of the teeth wire groove seats 41 and 420 can form corresponding concave and convex locking face portions, and can let two adjacent ones be joined as an annularly closed locking joint device.

The left and right sideward-standing face portions 417 of the teeth wire groove seats 41 and 420 can form corresponding planar shapes, and can let two adjacent ones be joined as an annularly closed planar joint device.

The left and right sideward-standing face portions 414, 415, and 417 of the teeth wire groove seats 41 and 420 can form various kinds of corresponding concave and convex and planar shapes, and can let two adjacent ones be joined as an annularly closed stable device.

Or only one end of the left or right sideward-standing face portion of the teeth wire groove seats 41 and 420 forms a sideward-standing face portion 414, 415, and 417, and is correspondingly joined with a sideward-standing end face of the left or right side of an adjacent curved teeth face 313 of the stator, and lets two adjacent ones be joined as an annularly closed stable device.

One end face of each of the lengthwise vertical poles 425 of the teeth wire groove seats 41 can be a curved teeth face end portion 412, and the other end face thereof can be a thin insulating portion 416. The whole structure is similar to I-shaped teeth wire groove seats 41. The stator coil portions 411 are directly wound around the lengthwise vertical poles 425 of the I-shaped teeth wire groove seats 41.

One end face of each of the lengthwise vertical poles 425 of the teeth wire groove seats 41 can be a curved teeth face end portion 412, and the other end face thereof can be open and unformed. The whole structure is similar to T-shaped teeth wire groove seats 420. The stator coil portions 411 are wound (e.g., using a spindle winding machine) or bent (e.g., using a spring-forming machine) beforehand and then sleeved onto the lengthwise vertical poles 425 of the T-shaped teeth wire groove seats 420.

The teeth wire groove seats 418 and 419 can be longitudinally divided in the middle into two independent unit bodies, but these two unit bodies must correspond to each other and can be joined together to form the whole teeth wire groove seat.

An upper and a lower ends of the teeth face end portion 412 of the teeth wire groove seats 41, 418, 419, and 420 respectively form a positioning hole 421, a positioning guide needle 422, or a positioning pole 423, which let a copper foil circuit board be disposed on an end face of the teeth wire groove seats 41, 418, 419, and 420 in concentric positioning way.

The stator coil portions 411 can be exciting coils of a stator of an electromotor.

The stator coil portions 411 can also be induction coils of a stator of a generator.

Although the present invention has been described with reference to the preferred embodiment thereof, it will be understood that the invention is not limited to the details thereof. Various substitutions and modifications have been suggested in the foregoing description, and other will occur to those of ordinary skill in the art. Therefore, all such substitutions and modifications are intended to be embraced within the scope of the invention as defined in the appended claims.

I claim:

1. A structure of a stator forming an annularly closed stable structure, comprising:

a plurality of stator teeth magnetic conductors respectively having curved faces, said plurality of stator teeth magnetic conductors extending from embedding grooves of annular magnetic conductors of the stator, said curved faces thereof having a contour corresponding to face portions of a rotor and being capable of generating an armature reaction; and a plurality of teeth wire groove seats respectively receiving said plurality of stator teeth magnetic conductors, each of said plurality of teeth wire groove seats including:

(a). teeth back face end portions disposed adjacent back face ends of said curved faces of said stator teeth magnetic conductors;

(b). two sideward-standing face portions respectively formed at a left end and a right end of said teeth back face end portion and being joined to each other; and, (c). a lengthwise vertical pole portion for receiving a stator coil thereon, said lengthwise vertical pole portion having an inner hollow end for sleeving a root end of a corresponding one of said stator teeth magnetic conductors therein.

2. The structure of a stator as claimed in claim 1, wherein said left and right sideward-standing face portions of each of said teeth wire groove seats respectively form corresponding concave and convex fastening face portions, and let two adjacent ones be joined as an annularly closed fastening joint device.

3. The structure of a stator as claimed in claim 1, wherein said left and right sideward-starting face portions of each of said teeth wire groove seats respectively form corresponding concave and convex locking face portions, and let two adjacent ones be joined as an annularly closed fastening joint device.

4. The structure of a stator as claimed in claim 1, wherein said left and right sideward-standing face portions of each of said teeth wire groove seats respectively form corresponding planar shapes, and let two adjacent ones be joined as an annularly closed planar joint device.

5. The structure of a stator as claimed in claim 1, wherein one end face of each of said lengthwise vertical pole portions of said teeth wire groove seats is a curved teeth face end portion, and the other end face thereof is a thin insulating portion, the said teeth wire groove seats each having an I-shaped contour, said stator coils being respectively directly wound around said lengthwise vertical pole portions of said I-shaped teeth wire groove seats.

6. The structure of a stator as claimed in claim 1, wherein one end face of each of said lengthwise vertical pole portions of said teeth wire groove seats is a curved teeth face end portion, and the other end face thereof is open and unformed, the said teeth wire groove seats each having a T-shaped contour, said stator coils being respectively directly wound or pre-bent and then sleeved onto said lengthwise vertical pole portions of said T-shaped teeth wire groove seats.

7. The structure of a stator as claimed in claim 1, wherein each of said teeth wire groove seats are longitudinally divided in a middle thereof into two independent unit bodies, said two unit bodies being disposed in correspondence to each other anti joined together to form a whole teeth wire groove seat.

8. The structure of a stator as claimed in claim 1, wherein each of said teeth wire groove seats has teeth face end portions having a respective one of an upper end and a lower end, said upper and lower end respectively having one of a positioning hole, a positioning guide needle, or a positioning pole formed therein for positioning a copper foil circuit board on an end face of said teeth wire groove seats.

9. The structure of a stator as claimed in claim 1, wherein said stator coils are exciting coils of the stator of an electromotor.

10. The structure of a stator as claimed in claim 1, wherein said stator coils are induction coils of the stator of a generator.

\* \* \* \* \*